US012768984B2

(12) United States Patent
Lee et al.

(10) Patent No.: US 12,768,984 B2
(45) Date of Patent: Oct. 20, 2026

(54) SYNTHETIC APERTURE RADAR SYSTEM

(71) Applicant: KOREA AEROSPACE RESEARCH INSTITUTE, Daejeon (KR)

(72) Inventors: Hyeon-Cheol Lee, Daejeon (KR); Sang Gyu Lee, Daejeon (KR); Eun-Su Kang, Daejeon (KR); Sang Burm Ryu, Daejeon (KR); Myung-Jin Baek, Daejeon (KR)

(73) Assignee: KOREA AEROSPACE RESEARCH INSTITUTE, Daejeon (KR)

(*) Notice: Subject to any disclaimer, the term of this patent is extended or adjusted under 35 U.S.C. 154(b) by 205 days.

(21) Appl. No.: 18/779,519

(22) Filed: Jul. 22, 2024

(65) Prior Publication Data

US 2025/0172692 A1 May 29, 2025

(30) Foreign Application Priority Data

Nov. 28, 2023 (KR) ........................ 10-2023-0168460

(51) Int. Cl.
*G01S 13/90* (2006.01)
*G01S 7/41* (2006.01)

(52) U.S. Cl.
CPC ............. *G01S 13/9017* (2013.01); *G01S 7/41* (2013.01)

(58) Field of Classification Search
CPC ...... G01S 13/00; G01S 13/282; G01S 13/284; G01S 13/90; G01S 13/9017; G01S 7/41
See application file for complete search history.

(56) References Cited

U.S. PATENT DOCUMENTS

| | | | | |
|---|---|---|---|---|
| 5,926,125 A * | 7/1999 | Wood | G01S 13/28 | 342/101 |
| 10,746,868 B1 * | 8/2020 | Carlsten | G01S 13/9052 | |
| 11,506,778 B2 * | 11/2022 | Fox | G01S 13/282 | |
| 2006/0049981 A1 * | 3/2006 | Merkel | G01S 13/0209 | 342/195 |
| 2010/0039313 A1 * | 2/2010 | Morris | G01S 13/28 | 342/25 R |
| 2016/0103216 A1 * | 4/2016 | Whelan | G01S 13/90 | 342/25 A |
| 2017/0016979 A1 * | 1/2017 | Cho | G01S 7/4004 | |
| 2018/0356516 A1 * | 12/2018 | Fox | G01S 13/90 | |
| 2019/0361113 A1 | 11/2019 | Ray | | |
| 2020/0142055 A1 * | 5/2020 | Fox | G01S 13/9011 | |
| 2020/0309933 A1 * | 10/2020 | Ray | G01S 13/282 | |

(Continued)

FOREIGN PATENT DOCUMENTS

| | | |
|---|---|---|
| JP | 2003075529 | 3/2003 |
| KR | 19990060500 | 7/1999 |
| KR | 20190134510 | 12/2019 |

(Continued)

*Primary Examiner* — Peter M Bythrow
(74) *Attorney, Agent, or Firm* — Perman & Green, LLP

(57) ABSTRACT

A synthetic aperture radar (SAR) system includes a chirp pulse generation unit configured to generate chirp pulses with a frequency increasing with time, a data storage unit storing transmission data, a chirp pulse modulation unit configured to generate modulated chirp pulses by modulating the chirp pulses through phase shift keying according to at least one bit value of the transmission data, and a transceiver unit configured to convert the modulated chirp pulses into a radio signal and transmit the radio signal.

17 Claims, 13 Drawing Sheets

(56) References Cited

U.S. PATENT DOCUMENTS

2021/0396866 A1* 12/2021 Giancristofaro ...... G01S 7/4017
2022/0365171 A1* 11/2022 Martinez ................. G01S 13/89

FOREIGN PATENT DOCUMENTS

KR 20220092143 1/2022
KR 102547192 6/2023
KR 20230108236 7/2023

* cited by examiner

SYNTHETIC APERTURE RADAR SYSTEM

GOVERNMENT RIGHTS STATEMENT

This work was partially supported by the 'CAS500 P2 program' of the National Research Foundation of Korea (NRF) (2022M1A3A4A06095848) and 'C-band SAR Payload Development program' of the Korea Aerospace Research Institute (KARI) funded by the Korean government (MOE).

CROSS-REFERENCE TO RELATED APPLICATION

This application is based on and claims priority under 35 U.S.C. § 119 to Korean Patent Application No. 10-2023-0168460, filed on Nov. 28, 2023, in the Korean Intellectual Property Office, the disclosure of which is incorporated by reference herein in its entirety.

BACKGROUND

1. Field

The disclosure relates to a synthetic aperture radar (SAR) system, and more particularly, to a SAR system configured to perform SAR operations while transmitting and receiving data.

2. Description of the Related Art

A synthetic aperture radar (SAR) system refers to a system capable of producing radar images of objects from signals reflected from the objects by using chirp pulses at any time of day and night regardless of weather conditions such as rain, snow, or fog.

Low-Earth orbit satellites generally orbit about 14 times a day (about 100 minutes per orbit), but pass over the Korean Peninsula twice a day and observe the ground with SAR only for 2.5 minutes while passing over the Korean Peninsula. In this case, independent transmitters and antennas may be installed on low-Earth orbit satellites such that the low-Earth orbit satellites may transmit, to a ground station on Earth, SAR data accumulated while observing the ground with SAR. When a low-Earth orbit satellite passes over the Korean Peninsula, the low-Earth orbit satellite may use different antennas and transmitters to prevent frequency overlap between SAR signals (chirp pulses) and data transmission signals. Therefore, low-Earth orbit satellites may each be equipped with separate antennas and transceiver for SAR and data transmission.

However, this increases the weight and size of satellites because each satellite requires an SAR system and a data transmission system.

SUMMARY

Provided is a synthetic aperture radar (SAR) system capable of transmitting and receiving data using SAR signals.

Additional aspects will be set forth in part in the description which follows and, in part, will be apparent from the description, or may be learned by practice of the presented embodiments of the disclosure.

According to an aspect of the disclosure, a synthetic aperture radar (SAR) system includes a chirp pulse generation unit configured to generate chirp pulses with a frequency increasing with time, a data storage unit storing transmission data, a chirp pulse modulation unit configured to generate modulated chirp pulses by modulating the chirp pulses through phase shift keying according to at least one bit value of the transmission data, and a transceiver unit configured to convert the modulated chirp pulses into a radio signal and transmit the radio signal.

In some embodiments, the chirp pulse modulation unit may be further configured to generate the modulated chirp pulses by phase shifting the chirp pulses by a phase value corresponding to two bit values of the transmission data.

In some embodiments, the chirp pulse modulation unit may include a phase shift unit configured to generate first chirp pulses and second chirp pulses, the first and second chirp pulses having a phase difference of 90° from the chirp pulses, a first modulation unit configured to generate first modulated chirp pulses by multiplying the first chirp pulses by one of +1 and −1 as determined according to a first bit value of the two bit values, a second modulator configured to generate second modulated chirp pulses by multiplying the second chirp pulses by one of +1 and −1 as determined according to a second bit value of the two bit values, and an adder configured to generate the modulated chirp pulses by adding the first modulated chirp pulses and the second modulated chirp pulses.

In some embodiments, when the chirp pulses (P(t)) are expressed as $A_0\exp(j\alpha t^2)$, the modulated chirp pulses ($P_m(t)$) may be expressed as $A_1\exp(j\alpha t^2+jM\pi/2)$. Here, $A_0$ may refer to an amplitude of the chirp pulses, $\alpha$ may refer to a range chirp rate of the chirp pulses, $A_1$ may refer to an amplitude of the modulated chirp pulses, and M may refer to a value determined according to the two bit values and may be one of 0, 1, 2, and 3.

In some embodiments, the chirp pulse modulation unit may be further configured to generate the modulated chirp pulses by phase shifting the chirp pulses by a phase value corresponding to a value of the transmission data.

In some embodiments, the chirp pulse modulation unit may be further configured to generate the modulated chirp pulses by multiplying the chirp pulses by one of +1 and −1 as determined according to the bit value.

In some embodiments, when the chirp pulses (P(t)) are expressed as $A_0\exp(j\alpha t^2)$, the modulated chirp pulses ($P_m(t)$) may be expressed as $A_1\exp(j\alpha t^2+jM\pi)$. Here, $A_0$ may refer to an amplitude of the chirp pulses, $\alpha$ may refer to a range chirp rate of the chirp pulses, $A_1$ may refer to an amplitude of the modulated chirp pulses, and M may refer to a value determined according to the 1-bit value and may be one of 0 and 1.

In some embodiments, the chirp pulse modulation unit may be further configured to generate the modulated chirp pulses by shifting the chirp pulses by a phase value corresponding to three bit values of the transmission data. The three bit values may include a first bit value, a second bit value, and a third bit value.

In some embodiments, the chirp pulse modulation unit may include a phase shift unit configured to generate first chirp pulses and second chirp pulses, the first and second chirp pulses having a phase difference of 90° from the chirp pulses, a first modulation unit configured to generate first modulated chirp pulses by multiplying one of +1 and −1 as determined according to the second bit value, one of $M_1$ and $M_2$ as determined according to the third bit value, and the first chirp pulses, a second modulation unit configured to generate second modulated chirp pulses by multiplying one of +1 and −1 as determined according to the first bit value, the other of $M_1$ and $M_2$ as determined according to an inversion of the third bit value, and the second chirp pulses, and an adder configured to generate the modulated chirp pulses by adding together the first modulated chirp pulses and the second modulated chirp pulses. Here, $M_1$ and $M_2$ may be preset amplitudes.

In some embodiments, when the chirp pulses (P(t)) are expressed as $A_0\exp(j\alpha t^2)$, the modulated chirp pulses ($P_m(t)$) may be expressed as $A_1\exp(j\alpha t^2+jM\pi/4)$. Here, $A_0$ may refer to an amplitude of the chirp pulses, $\alpha$ may refer to a range chirp rate of the chirp pulses, $A_1$ may refer to an amplitude of the modulated chirp pulses, and M may refer to a value determined according to the three bit values and may be one of 0, 1, 2, 3, 4, 5, 6, and 7.

In some embodiments, the SAR system may further include a chirp pulse demodulation unit configured to demodulate at least one bit value from received chirp pulses. The transceiver unit may be further configured to receive a radio signal from a ground station and generate the received chirp pulses from the received radio signal.

In some embodiments, the received chirp pulses may include I-channel received chirp pulses and Q-channel received chirp pulses. The chirp pulse demodulation unit may include a phase shift unit configured to generate I-channel chirp pulses and Q-channel chirp pulses from the chirp pulses, a first demodulation unit configured to generate a first output signal by performing a matched filtering process on the I-channel received chirp pulses and the I-channel chirp pulses, a second demodulation unit configured to generate a second output signal by performing a matched filtering process on the Q-channel received chirp pulses and the Q-channel chirp pulses, and a bit value determination unit configured to demodulate two bit values contained in the received radio signal, based on the first output signal and the second output signal.

In some embodiments, the bit value determination unit may be further configured to generate a reception timing of the received chirp pulses, based on at least one selected from the group consisting of the first output signal and the second output signal.

In some embodiments, the chirp pulse demodulation unit may include a demodulation unit configured to generate an output signal by performing a matched filtering process on the received chirp pulses and the chirp pulses, and a bit value determination unit configured to demodulate, based on the output signal, an one bit value contained in the received radio signal.

In some embodiments, the SAR system may further include a bit management unit configured to manage bit values of the transmission data and determine at least one bit value contained in a reflection signal that is transmitted by the transceiver unit, reflected from a ground object, and received by the transceiver unit, a modulated chirp pulse generation unit configured to generate modulated chirp pulses in response to the at least one bit value determined by the bit management unit, and a range compression data generation unit configured to generate range compression data, based on the modulated chirp pulses and received chirp pulses generated from the reflection signal received by the transceiver unit.

In some embodiments, the range compression data generation unit may be further configured to generate the range compression data by multiplying a result of Fourier transforming the received chirp pulses in a range direction and a conjugate of a result of Fourier transforming the modulated chirp pulses in the range direction.

In some embodiments, the SAR system may further include a layover determination unit configured to determine, based on the range compression data, whether a radar layover has occurred.

In some embodiments, the layover determination unit may be further configured to, when the layover determination unit determines that a radar layover has occurred in the received chirp pulses, generate candidates of modulated chirp pulses corresponding to a bit value different from the modulated chirp pulses, generate range compression data with respect to the received chirp pulses and the candidates of modulated chirp pulses, and. based on the range compression data, infer at least one bit value contained in the received chirp pulses.

In some embodiments, the bit management unit may be further configured to determine, based on the at least one bit value inferred by the layover determination unit, at least one bit value that is to be included in a next reflection signal to be received next time.

According to another aspect of the disclosure, a medium stores a computer program for executing methods described above by using a computing device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
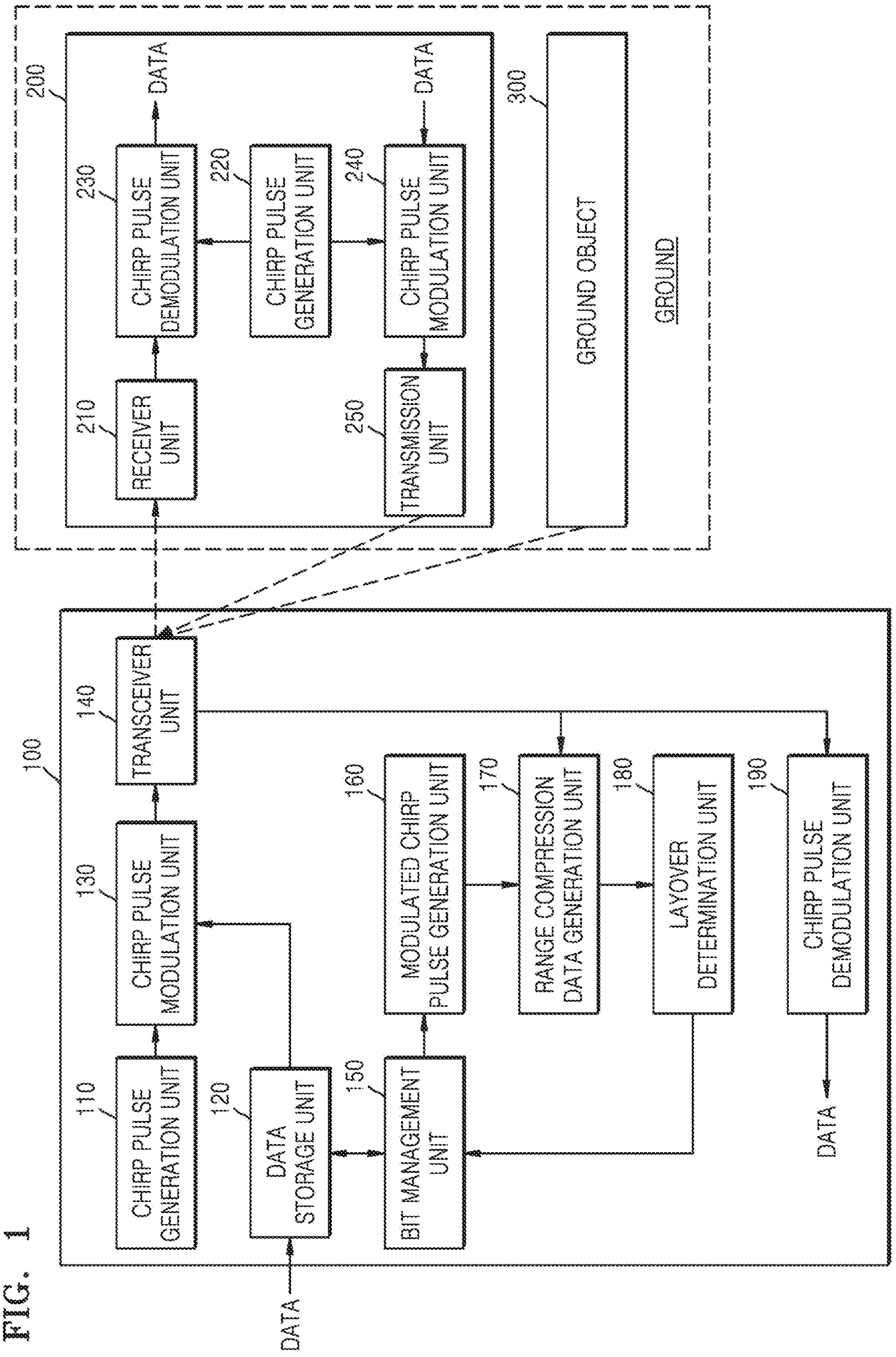
FIG. 1 is a block diagram illustrating a synthetic aperture radar (SAR) system and a ground station communication system according to an embodiment of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments will be described with reference to the accompanying drawings so that those of ordinary skill in the art may easily implement the idea of the disclosure. However, the disclosure may be implemented in various different forms and is not limited to the embodiments described herein. In the following descriptions of embodiments of the disclosure, well-known functions or configurations may be ruled out in order not to unnecessarily obscure subject matters of the disclosure. In the drawings, like reference numerals denote like elements, and repeated descriptions thereof are omitted.

In the specification, when a portion or element is referred to as being connected to another portion or element, the portion or element may be directly connected to the other portion or element, or may be indirectly connected to the other portion or elements with intervening portions or elements being therebetween. It will be further understood that the terms "comprises" and/or "comprising" used herein specify the presence of stated features or elements, but do not preclude the presence or addition of one or more other features or elements.

Some embodiments may be implemented as functional blocks and various processing operations. Some or all of the functional blocks may be implemented with various hardware and/or software configurations executing specific functions. For example, the functional blocks of the disclosure may be implemented with one or more microprocessors or circuit configurations having given functions. In addition, the functional blocks of the disclosure may be implemented with various programming or streaming languages. The functional blocks of the disclosure may be implemented by algorithms executed on one or more processors. In the disclosure, a function performed by a plurality of functional blocks, or a plurality of functions may be performed by a single functional block. Also, embodiments of the disclosure may employ related arts to establish an electronic environment, process signals and/or process data.

FIG. 1 is a block diagram illustrating a synthetic aperture radar (SAR) system 100 and a ground station communication system 200 according to an embodiment of the disclosure.

Referring to FIG. 1, the SAR system 100 includes a chirp pulse generation unit 110, a data storage unit 120, a chirp pulse modulation unit 130, and a transceiver unit 140.

The SAR system 100 may transmit data while performing an SAR observation process using chirp pulses. The SAR system 100 may be mounted on a satellite or aircraft and may observe an object (ground object) 300 on the ground. The SAR system 100 may fly in the sky in an azimuth direction and may periodically radiate chirp pulses. The chirp pulses may be reflected from objects on the ground such as the ground object 300, and the SAR system 100 may receive chirp pulses reflected from the ground object 300. The SAR system 100 may generate SAR images of the ground by performing an SAR image processing process on the reflected chirp pulses. The ground object 300 may refer to all objects on the ground, such as terrain, the sea, buildings, and cars.

The chirp pulse generation unit 110 may include a chirp pulse generator configured to generate chirp pulses with a frequency increasing with time. For example, chirp pulses may be expressed as $A_0\exp(j\alpha t^2)$. Here, $A_0$ refers to the amplitude of chirp pulses, and $\alpha$ refers to the range chirp rate of chirp pulses. In another example, chirp pulses may be expressed as $A_0 \cos(\alpha t^2)$. The frequency of chirp pulses is $\alpha t/(2\pi)$, and thus, when t is greater or less than 0 based on t=0, the frequency of chirp pulses increases. Chirp pulses may be generated at a preset period. For example, thousands of chirp pulses may be generated per second. The period of chirp pulses may be determined according to SAR requirements.

The data storage unit 120 may include memory or data storage that stores transmission data to be transmitted to the ground station communication system 200. The data storage unit 120 may transmit transmission data to the chirp pulse modulation unit 130 in the form of a bit stream. When the SAR system 100 transmits two bit information per chirp pulse, transmission data may be divided in units of two bits and transmitted to the chirp pulse modulation unit 130. When the SAR system 100 transmits one bit information per chirp pulse, transmission data may be transmitted one bit at a time to the chirp pulse modulation unit 130. When the SAR system 100 transmits three bit information per chirp pulse, transmission data may be transmitted three bits at a time to the chirp pulse modulation unit 130.

The chirp pulse modulation unit 130 may include a chirp pulse modulator configured to generate modulated chirp pulses by phase shift keying (PSK) according to at least one bit value of transmission data. The chirp pulse modulation unit 130 may receive chirp pulses from the chirp pulse generation unit 110 and receive at least one bit value of transmission data from the data storage unit 120. The chirp pulse modulation unit 130 may modulate the chirp pulses by PSK according to the at least one bit value to generate modulated chirp pulses. For example, when the chirp pulses are expressed as $A_0\exp(j\alpha t^2)$, the modulated chirp pulses may be expressed as $A_1\exp(j\alpha t^2+\phi)$. Here, $A_1$ refers to the amplitude of the modulated chirp pulses, and $\phi$ refers to a phase shift value determined according to the at least one bit value.

The transceiver unit 140 may include a transceiver configured to receive modulated chirp pulses from the chirp pulse modulation unit 130, convert the modulated chirp pulses into a radio signal, and transmit the radio signal. The transceiver unit 140 may up-convert modulated chirp pulses using a carrier frequency $\omega_{c1}$ and may then output the up-converted modulated chirp pulses to an antenna.

The ground station communication system 200 may include a receiver unit 210, a chirp pulse generation unit 220, and a chirp pulse demodulation unit 230.

The receiver unit 210 may include a receiver configured to receive a radio signal output from the transceiver unit 140 of the SAR system 100. The receiver unit 210 may include an antenna to receive radio signals. The receiver unit 210 may generate received chirp pulses by down-converting a received radio signal. For example, the receiver unit 210 may generate I-channel received chirp pulses and Q-channel received chirp pulses while down-converting a received radio signal.

The chirp pulse generation unit 220 may include a chirp pulse generator configured to generate chirp pulses identical to chirp pulses generated by the chirp pulse generation unit 110 of the SAR system 100. The chirp pulses generated by the chirp pulse generation unit 220 are referred to as reference chirp pulses.

The chirp pulse demodulation unit 230 may include a chirp pulse demodulator configured to demodulate, using the reference chirp pulses and the received chirp pulses, at least one bit value included in the radio signal received from the receiver unit 210. The ground station communication system 200 may receive data transmitted from the SAR system 100 by accumulating at least one bit value demodulated by the chirp pulse demodulation unit 220.

The ground station communication system 200 may transmit data to the SAR system 100. To this end, the ground station communication system 200 may further include a chirp pulse modulation unit 240 and a transmission unit 250.

The chirp pulse modulation unit 240 may include a chirp pulse modulator having substantially the same structure as the chirp pulse modulation unit 130 of the SAR system 100. The chirp pulse modulation unit 240 may receive reference chirp pulses from the chirp pulse generation unit 220 and receive at least one bit value of data to be transmitted to the SAR system 100. The chirp pulse modulation unit 240 may modulate the reference chirp pulses by PSK according to the at least one bit value to generate modulated chirp pulses.

The transmission unit 250 may include a transmitter configured to receive modulated chirp pulses from the chirp pulse modulation unit 130, convert the modulated chirp pulses into a radio signal, and transmit the radio signal The transmission unit 250 may generate a transmission signal by up-converting the modulated chirp pulses using a carrier frequency $\omega_{c2}$. The carrier frequency $\omega_{c2}$ used by the transmission unit 250 to generate the transmission signal may be different from the carrier frequency $\omega_{c1}$ used by the transceiver unit 140 to generate a radio signal. The transmission unit 250 may include an antenna to wirelessly transmit the transmission signal to the SAR system 100. Although the transmission unit 250 and the receiver unit 210 are shown as separate units, this is merely an example, and the transmission unit 250 and the receiver unit 210 may be integrated into one transceiver unit like the transceiver unit 140 of the SAR system 100.

The chirp pulse generation unit 220, the chirp pulse demodulation unit 230, and the chirp pulse modulation unit 240 may be functional blocks that are operable or executable by at least one processor included in the ground station communication system 200.

The SAR system 100 may further include a chirp pulse demodulation unit 190 configured to demodulate data included in a radio signal transmitted from the ground station communication system 200. The chirp pulse demodulation unit 190 may have substantially the same structure as the chirp pulse demodulation unit 230 of the ground station communication system 200.

The transceiver unit 140 may receive a radio signal output from the transmission unit 250 of the ground station communication system 200. The transceiver unit 140 may include an antenna to receive radio signals. The transceiver unit 140 may down-convert a received radio signal to generate received chirp pulses. For example, the transceiver unit 140 may generate I-channel received chirp pulses and Q-channel received chirp pulses while down-converting the received radio signal.

The chirp pulse demodulation unit 190 may include a chirp pulse demodulator configured to use chirp pulses generated by the chirp pulse generation unit 110 and received chirp pulses generated by the transceiver unit 140 to demodulate at least one bit value contained in a radio signal received from the transceiver unit 140. The SAR system 100 may receive data transmitted from the ground station communication system 200 by accumulating at least one bit value demodulated by the chirp pulse demodulation unit 190.

The SAR system 100 may further include a bit management unit 150, a modulated chirp pulse generation unit 160, a range compression data generation unit 170, and a layover determination unit 180.

The bit management unit 150 may manage bit values of transmission data and determine at least one bit value contained in a signal (reflection signal) that is transmitted by the transceiver unit 140, reflected from the ground object 300, and received by the transceiver unit 140. The modulated chirp pulse generation unit 160 may generate modulated chirp pulses in response to the at least one bit value determined by the bit management unit 150. The range compression data generation unit 170 may generate range compression data based on the received chirp pulses and the modulated chirp pulses that are generated from the reflection signal received through the transceiver unit 140. The layover determination unit 180 may determine, based on the range compression data, whether a radar layover has occurred.

The chirp pulse modulation unit 130, the bit management unit 150, the modulated chirp pulse generation unit 160, the range compression data generation unit 170, the layover determination unit 180, and the chirp pulse demodulation unit 190 may be functional blocks that are operable or executable by at least one processor included in the SAR system 100.

The SAR system 100 shown in FIG. 1 may be implemented using an SAR antenna, at least one processor, and a memory device accessible by the at least one processor. Some components of the SAR system 100 may be implemented as functional blocks that are operable or executable ed by the at least one processor.

Figure 2:
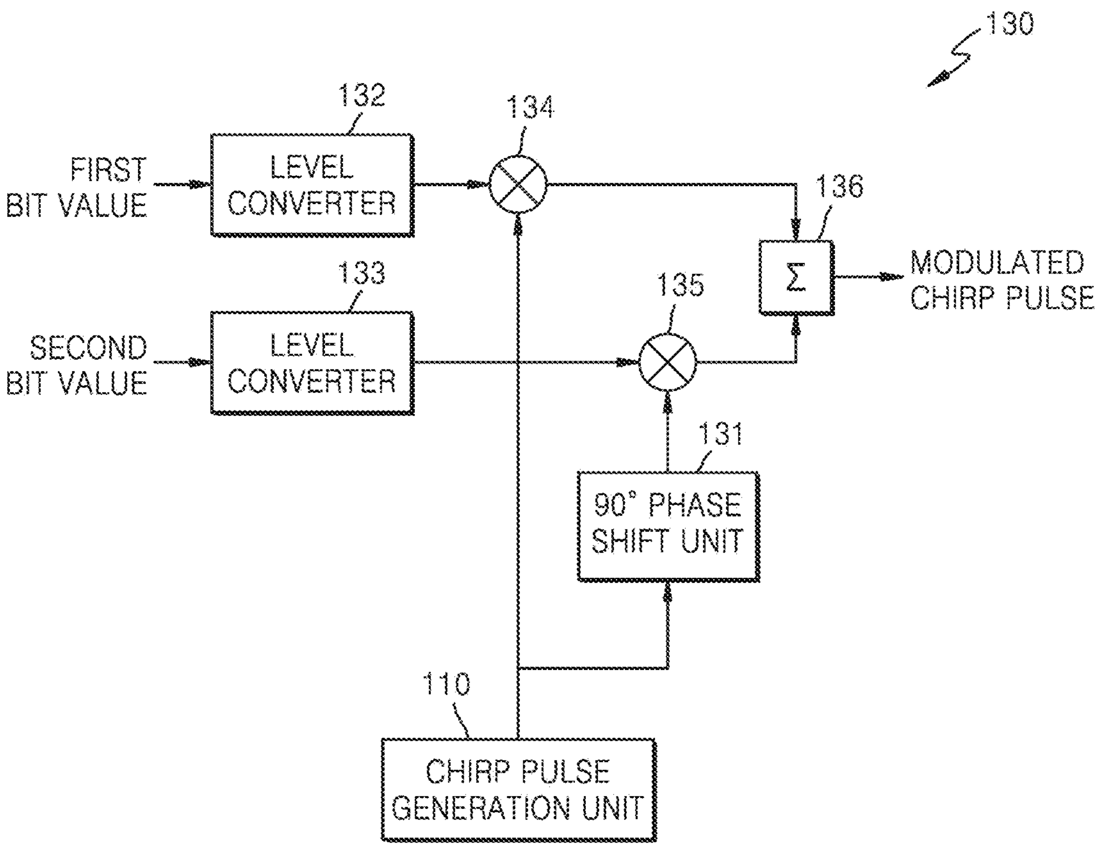
FIG. 2 is a diagram illustrating an internal block of a chirp pulse modulation unit that performs quadrature phase shift keying (QPSK), according to an embodiment of the disclosure.

FIG. 2 is a diagram illustrating an internal block of the chirp pulse modulation unit 130 that performs quadrature phase shift keying (QPSK) according to an embodiment of the disclosure.

Referring to FIG. 2, the chirp pulse modulation unit 130 may shift chirp pulses generated by the chirp pulse generation unit 110 by the amount of a phase value corresponding to two bit values of transmission data, thereby generating modulated chirp pulses. The two bit values of the transmission data includes a first bit value and a second bit value.

The chirp pulse modulation unit 130 may include a phase shift unit 131, first and second level converters 132 and 133, first and second multipliers 134 and 135, and an adder 136.

The phase shift unit 131 may generate first chirp pulses and second chirp pulses that have a phase difference of 90° from chirp pulses. For example, the first chirp pulses may be the same as chirp pulses generated by the chirp pulse generation unit 110. The second chirp pulses may be obtained by shifting the phase of chirp pulses generated by the chirp pulse generation unit 110 by an amount of 90°. In another example, the first chirp pulses may be I-channel chirp pulses, and the second chirp pulses may be Q-channel chirp pulses. In another example, the first chirp pulses may be obtained by shifting the phase of chirp pulses by an amount of −45°, and the second chirp pulses may be obtained by shifting the phase of the chirp pulses by an amount of +45°.

The first level converter 132 may perform a conversion to a level of either +1 or −1 according to the first bit value. For example, when the first bit value is '1,' the first level converter 132 may output a level corresponding to +1. When the first bit value is '0,' the first level converter 132 may output a level corresponding to −1. The second level converter 133 may perform a conversion to a level of either +1 or −1 according to the second bit value in the same manner as the first level converter 132 performs a conversion.

The first multiplier 134 may generate first modulated chirp pulses by multiplying a level of either +1 or −1 output from the first level converter 132 by the first chirp pulses. The second multiplier 135 may generate second modulated chirp pulses by multiplying a level of either +1 or −1 output from the second level converter 133 by the second chirp pulses. The first level converter 132 and the first multiplier 134 may be referred to as a first modulation unit, and the second level converter 133 and the second multiplier 135 may be referred to as a second modulation unit.

The adder 136 may generate modulated chirp pulses by adding the first modulated chirp pulses and the second modulated chirp pulses. The modulated chirp pulses may be chirp pulses that are phase shifted by a phase value corresponding to the two bit values. For example, when the two bit values is '11,' the modulated chirp pulses may be chirp pulses that are phase shifted by an amount of 45°. When the two bit values is '10,' the modulated chirp pulses may be chirp pulses that are phase shifted by an amount of −45°. When the two bit values is '01,' the modulated chirp pulses may be chirp pulses that are phase shifted by an amount of 135°. When the two bit values is '00,' the modulated chirp pulses may be chirp pulses that are phase shifted by an amount of −135°.

In another embodiment, chirp pulses P(t) may be expressed as $A_0\exp(j\alpha t^2)$. In this case, modulated chirp pulses $P_m(t)$ may be expressed as $A_1\exp(j\alpha t^2+jM\pi/2)$. Here, $A_0$ may refer to the amplitude of the chirp pulses P(t), α may refer to the range chirp rate of the chirp pulses P(t), $A_1$ may refer to the amplitude of the modulated chirp pulses $P_m(t)$, and M may refer to a value determined according to two bit values and may be 0, 1, 2, or 3.

Figure 3:
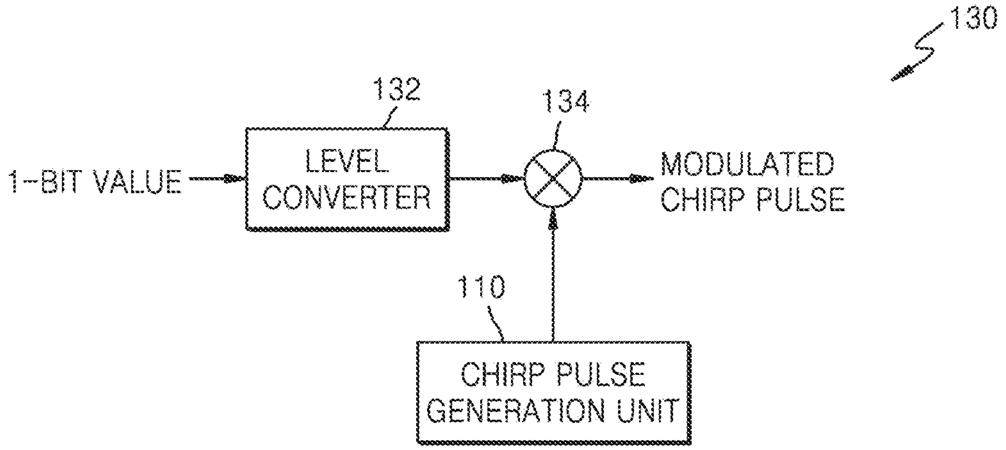
FIG. 3 is a diagram illustrating an internal block of a chirp pulse modulation unit that performs binary phase shift keying (BPSK), according to another embodiment of the disclosure.

FIG. 3 is a diagram illustrating an internal block of the chirp pulse modulation unit 130 that performs binary phase shift keying (BPSK) according to another embodiment of the disclosure.

Referring to FIG. 3, the chirp pulse modulation unit 130 may shift chirp pulses generated by the chirp pulse generation unit 110 by the amount of a phase value corresponding to a 1-bit value of transmission data, thereby generating modulated chirp pulses. In an example, the chirp pulse modulation unit 130 may generate modulated chirp pulses by multiplying chirp pulses by either +1 or −1 determined according to the 1-bit value.

The chirp pulse modulation unit 130 may include a level converter 132 and a multiplier 134.

The level converter 132 may perform a conversion to a level of either +1 or −1 depending on a 1-bit value of transmission data. For example, when a first bit value is '1,' the first level converter 132 may output a level corresponding to +1. When the first bit value is '0,' the first level converter 132 may output a level corresponding to −1. The multiplier 134 may generate modulated chirp pulses by multiplying a level of either +1 or −1 output from the level converter 132 and chirp pulses generated by the chirp pulse generation unit 110.

For example, when chirp pulses P(t) are expressed as $A_0\exp(j\alpha t^2)$, modulated chirp pulses $P_m(t)$ may be expressed as $A_1\exp(j\alpha t^2+jM\pi)$. Here, $A_0$ may refer to the amplitude of the chirp pulses P(t), α may refer to the range chirp rate of the chirp pulses P(t), $A_1$ may refer to the amplitude of the modulated chirp pulses $P_m(t)$, and M may refer to a value determined according to a 1-bit value and may be either 0 or 1.

Figure 4:
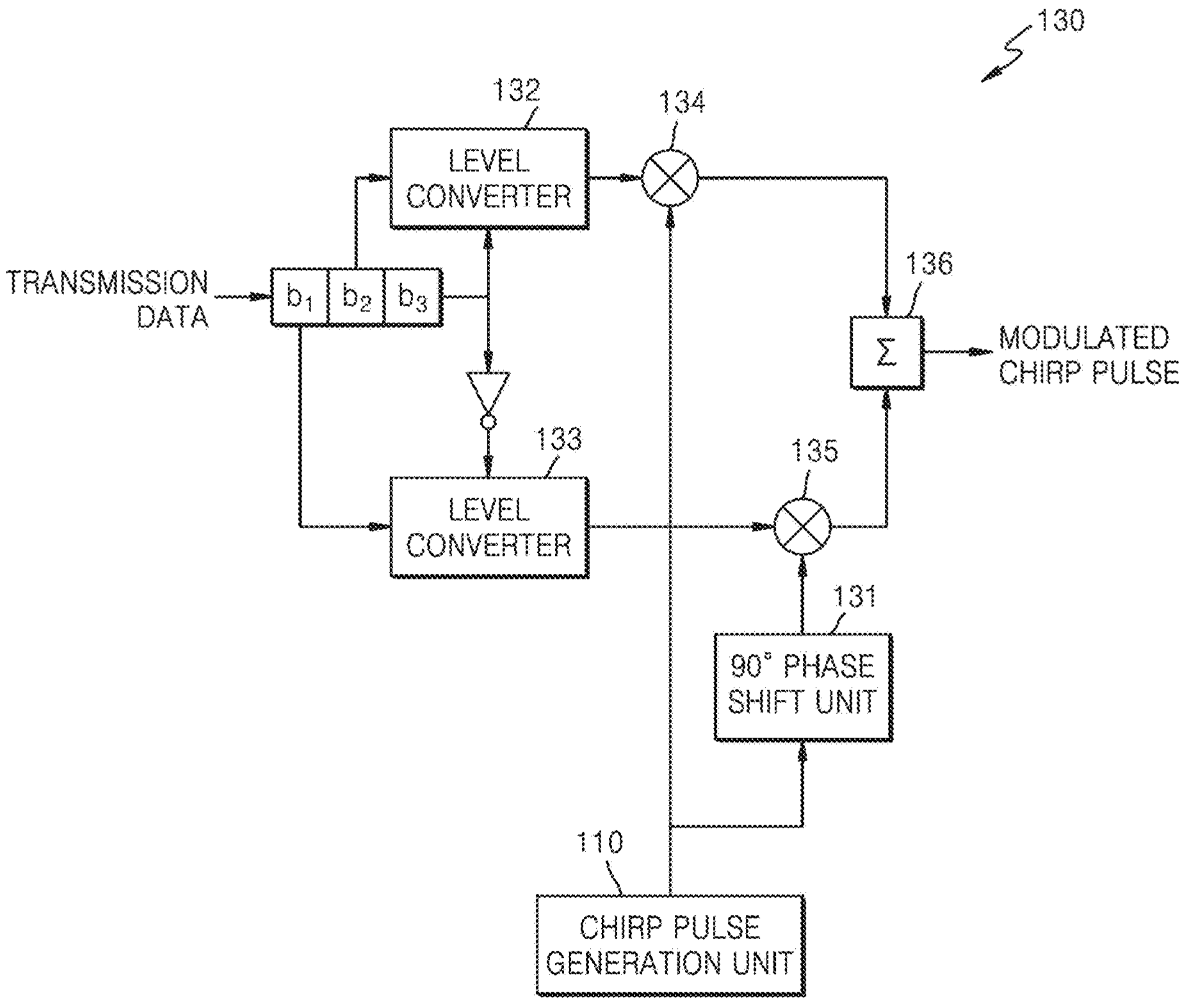
FIG. 4 is a diagram illustrating an internal block of a chirp pulse modulation unit that performs phase shift keying (8PSK), according to another embodiment of the disclosure.

FIG. 4 shows an internal block of the chirp pulse modulation unit 130 that performs 8-phase shift keying (8PSK) according to another embodiment of the disclosure.

Referring to FIG. 4, the chirp pulse modulation unit 130 may shift chirp pulses generated by the chirp pulse generation unit 110 by the amount of a phase value corresponding to three bit values of transmission data, thereby generating modulated chirp pulses. The three bit values of the transmission data includes a first bit value $b_1$, a second bit value $b_2$, and a third bit value $b_3$.

The chirp pulse modulation unit 130 may include a phase shift unit 131, first and second level converters 132 and 133, first and second multipliers 134 and 135, and an adder 136.

The phase shift unit 131 may generate first chirp pulses and second chirp pulses that have a phase difference of 90° from chirp pulses. For example, the first chirp pulses may be the same as chirp pulses generated by the chirp pulse generation unit 110. The second chirp pulses may be obtained by shifting the phase of the chirp pulses generated by the chirp pulse generation unit 110 by an amount of 90°. In another example, the first chirp pulses may be I-channel chirp pulse, and the second chirp pulses may be Q-channel chirp pulses.

The first level converter 132 may perform a conversion to a level of one of $+M_1$, $+M_2$, $-M_2$, and $-M_1$ according to the second bit value $b_2$ and the third bit value $b_3$. Here, $M_1$ and $M_2$ may refer to preset amplitudes, and $M_1$ may be greater than $M_2$. For example, one of +1 and −1 may be determined according to the second bit value $b_2$, and one of $M_1$ and $M_2$ may be determined according to the third bit value $b_3$. For example, $M_1$ may be 1.307 and $M_2$ may be 0.541.

For example, when the second bit value $b_2$ and the third bit value $b_3$ are '11,' the first level converter 132 may output a level corresponding to $+M_1$. When the second bit value $b_2$ and the third bit value $b_3$ are '10,' the first level converter 132 may output a level corresponding to $+M_2$. When the second bit value $b_2$ and the third bit value $b_3$ are '01,' the first level converter 132 may output a level corresponding to $-M_1$. When the second bit value $b_2$ and the third bit value $b_3$ are '00,' the first level converter 132 may output a level corresponding to $-M_2$.

The second level converter 133 may perform a conversion to a level of one of $+M_1$, $+M_2$, $-M_2$, and $-M_1$ according to the first bit value $b_1$ and the inversion value $\sim b_3$ of the third bit value $b_3$. For example, when the first bit value $b_1$ and the inversion value $\sim b_3$ of the third bit value $b_3$ are '11,' that is, the first bit value $b_1$ and the third bit value $b_3$ are '10,' the second level converter 133 may output a level corresponding to $+M_1$. When the first bit value $b_1$ and the inversion value $\sim b_3$ of the third bit value $b_3$ are '10,' that is, the first bit value $b_1$ and the third bit value $b_3$ are '11,' the second level converter 133 may output a level corresponding to $+M_2$. When the first bit value $b_1$ and the inversion value $\sim b_3$ of the third bit value $b_3$ are '01,' that is, the first bit value $b_1$ and the third bit value $b_3$ are '00,' the second level converter 133 may output a level corresponding to $-M_1$. When the first bit value $b_1$ and the inversion value $\sim b_3$ of the third bit value $b_3$ are '00,' that is, the first bit value $b_1$ and the third bit value $b_3$ are '01,' the second level converter 133 may output a level corresponding to $-M_2$.

The first multiplier 134 may generate first modulated chirp pulses by multiplying the first chirp pulses by one of the levels of $+M_1$, $+M_2$, $-M_2$, and $-M_1$ that is output from the first level converter 132. The second multiplier 135 may generate second modulated chirp pulses by multiplying the second chirp pulses by one of the levels of $+M_1$, $+M_2$, $-M_2$, and $-M_1$ that is output from the second level converter 133. The first level converter 132 and the first multiplier 134 may be referred to as a first modulation unit, and the second level converter 133 and the second multiplier 135 may be referred to as a second modulation unit.

The adder 136 may generate modulated chirp pulses by adding the first modulated chirp pulses and the second modulated chirp pulses together. The modulated chirp pulses may be obtained by shifting the phase of chirp pulses by an amount corresponding to the three bit values.

For example, chirp pulses P(t) may be expressed as $A_0\exp(j\alpha t^2)$. In this case, modulated chirp pulses $P_m(t)$ may be expressed as $A_1\exp(j\alpha t^2+jM\pi/4)$. Here, $A_0$ may refer to the amplitude of the chirp pulses P(t), α may refer to the range chirp rate of the chirp pulses P(t), $A_1$ may refer to the amplitude of the modulated chirp pulses $P_m(t)$, and M may refer to a value determined according to three bit values and may be one of 0, 1, 2, 3, 4, 5, 6, and 7.

Figure 5:
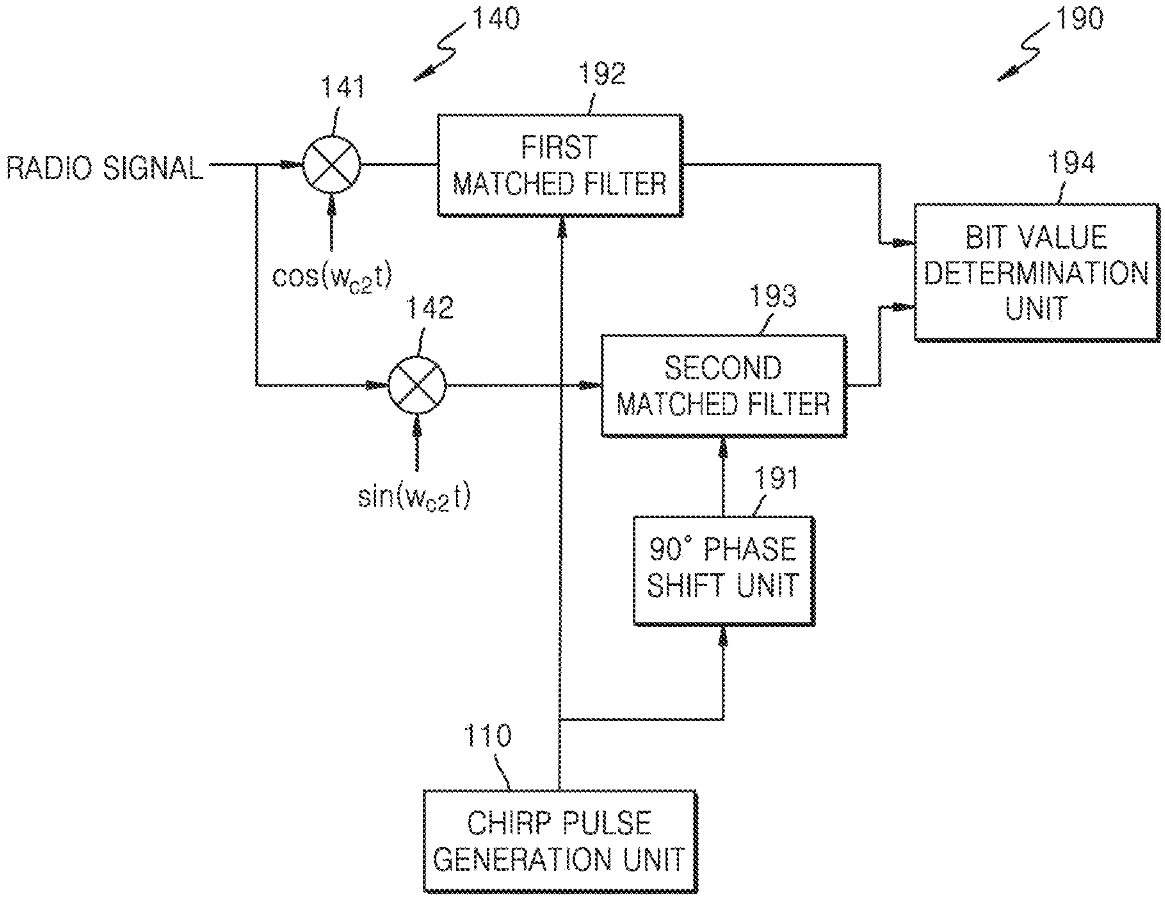
FIG. 5 is a diagram illustrating an internal block of a chirp pulse demodulation unit that demodulates a radio signal modulated by QPSK, according to an embodiment of the disclosure.

FIG. 5 is a diagram illustrating an internal block of the chirp pulse demodulation unit 190 that demodulates a radio signal modulated by QPSK according to an embodiment of the disclosure.

Referring to FIG. 5, the transceiver unit 140 may receive a radio signal from the ground station communication system 200 and may generate received chirp pulses from the received radio signal. For example, the received chirp pulses may include I-channel received chirp pulses and Q-channel received chirp pulses. For example, the transceiver unit 140 may include a multiplier 141 configured to multiply the radio signal and $\cos(\omega_{c2}t)$ to output I-channel received chirp pulses, and a multiplier 142 configured to multiply the radio signal and $\sin(\omega_{c2}t)$ to output Q-channel received chirp pulses. Here, $\omega_{c2}$ refers to a carrier frequency used by the transmission unit 250 to generate the radio signal.

The chirp pulse demodulation unit 190 may demodulate at least one bit value contained in the radio signal from the received chirp pulses generated by the transceiver unit 140. The chirp pulse demodulation unit 190 may include a phase shift unit 191, a first matched filter 192, a second matched filter 193, and a bit value determination unit 194.

The phase shift unit 191 may generate I-channel chirp pulses and Q-channel chirp pulses from chirp pulses generated by the chirp pulse generation unit 110.

The first matched filter 192 may receive the I-channel chirp pulses and the I-channel received chirp pulses and may perform a matched filtering process on the I-channel received chirp pulses and the I-channel chirp pulses to generate a first output signal. The first matched filter 192 may be referred to as a first demodulation unit. The first output signal of the first matched filter 192 may be generated as a result of a convolution operation performed on the I-channel received chirp pulses and the I-channel chirp pulses.

The second matched filter 193 may receive the Q-channel chirp pulses and the Q-channel received chirp pulses and may perform a matched filtering process on the Q-channel received chirp pulses and the Q-channel chirp pulses to generate a second output signal. The second matched filter 192 may be referred to as a second demodulation unit. The second output signal of the second matched filter 193 may be generated as a result of a convolution operation performed on the Q-channel received chirp pulses and the Q-channel chirp pulses.

The bit value determination unit 194 may demodulate two bit values included in the radio signal received from the transceiver unit 140, based on the first output signal of the first matched filter 192 and the second output signal of the second matched filter 193. The bit value determination unit 194 may generate a reception timing of the received chirp pulses based on at least one of the first output signal and the second output signal.

Figure 6:
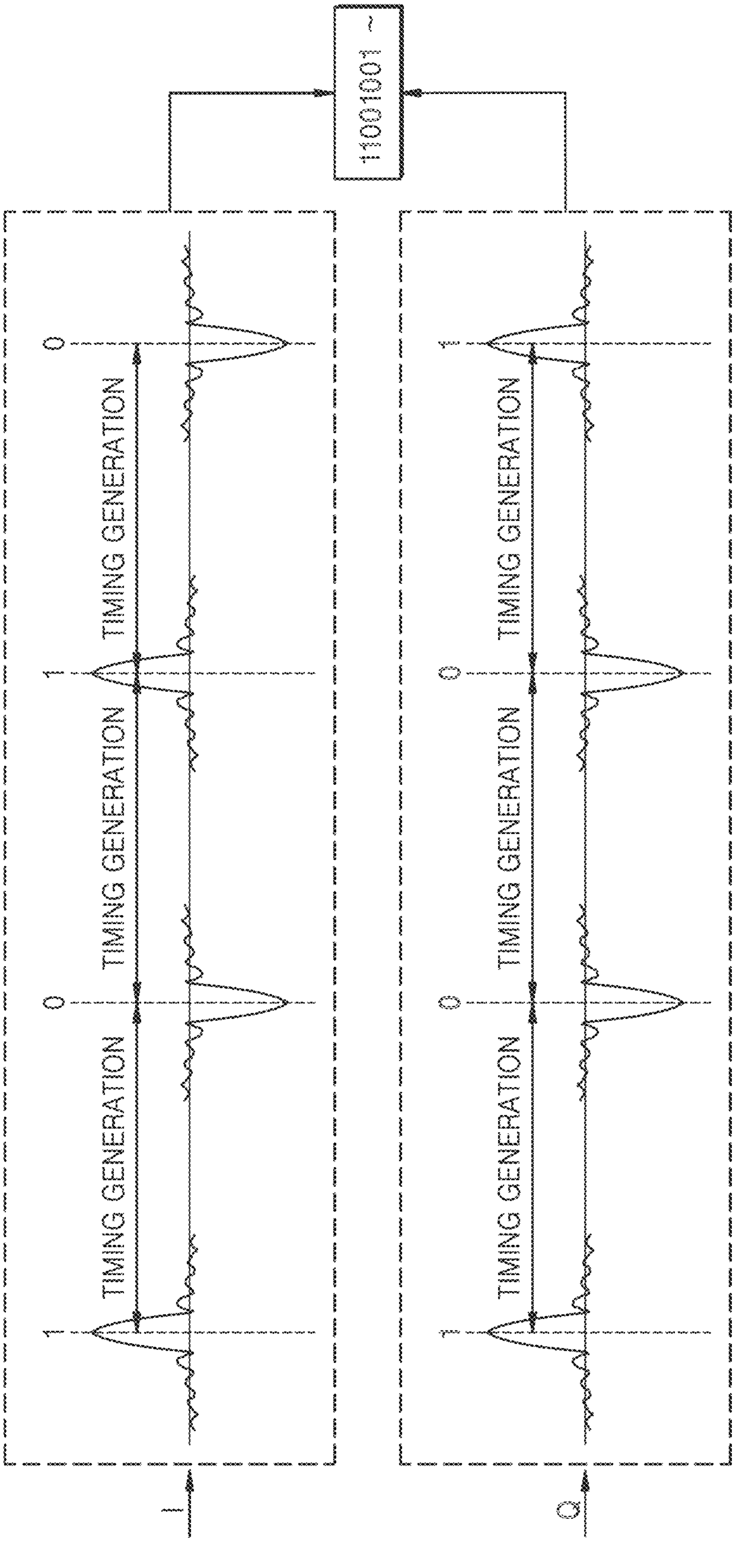
FIG. 6 is a diagram illustrating an operation of a bit value determination unit according to an embodiment of the disclosure.

FIG. 6 is a diagram illustrating an operation of the bit value determination unit 194 according to an embodiment of the disclosure.

Referring to FIG. 6, a first output signal I and a second output signal Q are generated with respect to four received chirp pulses.

When the magnitude of the first output signal I and the magnitude of the second output signal Q are both greater than 0, it may be determined that two bit values carried in a corresponding received chirp pulse is '11.' When the magnitude of the first output signal I and the magnitude of the second output signal Q are both less than 0, it may be determined that two bit values carried in a corresponding received chirp pulse is '00.' When the magnitude of the first output signal I is greater than 0 and the magnitude of the second output signal Q is less than 0, it may be determined that two bit values carried in a corresponding received chirp pulse is '10.' When the magnitude of the first output signal I is less than 0 and the magnitude of the second output signal Q is greater than 0, it may be determined that two bit values carried in a corresponding received chirp pulse is '01.'

When the first output signal I and the second output signal Q are sequentially generated in the example shown in FIG. 6, demodulated data is 11001001 as shown in FIG. 6.

The first and second matched filters 193 and 194 have peak values when the timing of chirp pulses and the timing of received chirp pulses coincide with each other. Thus, the bit value determination unit 194 may generate the reception timing of received chirp pulses based on when the first and second output signals I and Q have peak values and perform timing recovery.

Referring again to FIG. 1, the SAR system 100 may further include the bit management unit 150, the modulated chirp pulse generation unit 160, the range compression data generation unit 170, and the layover determination unit 180.

The bit management unit 150 manages bit values of transmission data stored in the data storage unit 120 and determines at least one bit value contained in a signal (reflection signal) that is transmitted by the transceiver unit 140, reflected from the ground object 300, and received by the transceiver unit 140.

The duration from the time the transceiver unit 140 transmits a radio signal corresponding to a modulated chirp pulse to the time the transceiver unit 140 receives a reflection signal reflected from the ground object 300 is equal to twice the distance between the SAR system 100 and the ground object 300 divided by the speed of light. A radio signal corresponding to another modulated chirp pulse may be output within the duration. That is, at least one bit value contained in a reflection signal may not be the same as at least one bit value contained in a radio signal just transmitted, but may be the same as at least one bit value contained in a radio signal transmitted several times before.

The bit management unit 150 may manage bit values of transmitted data by comparing transmitted bit values with received bit values. In most cases, chirp pulses are received in the order in which the chirp pulses were transmitted, and thus, the bit management unit 150 may predict at least one bit value included in a reflection signal to be received this time. The bit management unit 150 provides at least one bit value included in a reflection signal to be received this time to the modulated chirp pulse generation unit 160.

The modulated chirp pulse generation unit 160 may generate modulated chirp pulses in response to at least one bit value determined by the bit management unit 150. The modulated chirp pulses generated by the modulated chirp pulse generation unit 160 may be substantially the same as modulated chirp pulses generated by the chirp pulse modulation unit 130. However, the modulated chirp pulses generated by the modulated chirp pulse generation unit 160 may be in the form of digital data, and the modulated chirp pulse generated by the chirp pulse modulation unit 130 may be in the form of an analog signal.

The range compression data generation unit 170 may generate range compression data based on received chirp pulses generated from a reflection signal received by the transceiver unit 140 and modulated chirp pulses generated by the modulated chirp pulse generation unit 160. The transceiver unit 140 may receive a reflection signal that is output from the transceiver unit 140 and reflected back to the transceiver unit 140 from the ground. The transceiver unit 140 may down-convert the reflection signal to generate received chirp pulses.

The range compression data generation unit 170 generates range compression data by multiplying the result of Fourier transforming the received chirp pulses in a range direction by the conjugate of the result of Fourier transforming the modulated chirp pulses in the range direction. The range compression data may be data in a range-frequency domain. In another example, the range compression data may be data in a range-time domain. The range compression data in the range-time domain may be the inverse Fourier transform of the range compression data in the range-frequency domain.

For example, when received chirp pulses are $S_r(t,u)$ and modulated chirp pulses are $S_s(t,u)$, range compression data $S_1(f,u)$ in the range-frequency domain may be expressed as $FFTx\{S_r(t, u)\}conj[FFTx\{-S_s(t,u)\}]$. Here, FFTx{•} refers to Fourier transform in the range direction, and conj refers to a conjugate. Range compression data $S_1(t,u)$ in the range-time domain may be expressed as $IFFTx(S_1(f,u))$. Here, IFFTx{•} refers to inverse Fourier transform in the range direction.

The range compression data generated by the range compression data generation unit 170 may be stored in the data storage unit 120 and transmitted to the ground station communication system 200 through the chirp pulse modulation unit 130 and the transceiver unit 140. Thereafter, the ground station communication system 200 may generate SAR image data by performing azimuth FFT, range correction, azimuth compression, and azimuth IFFT on the received range compression data.

Figure 7A:
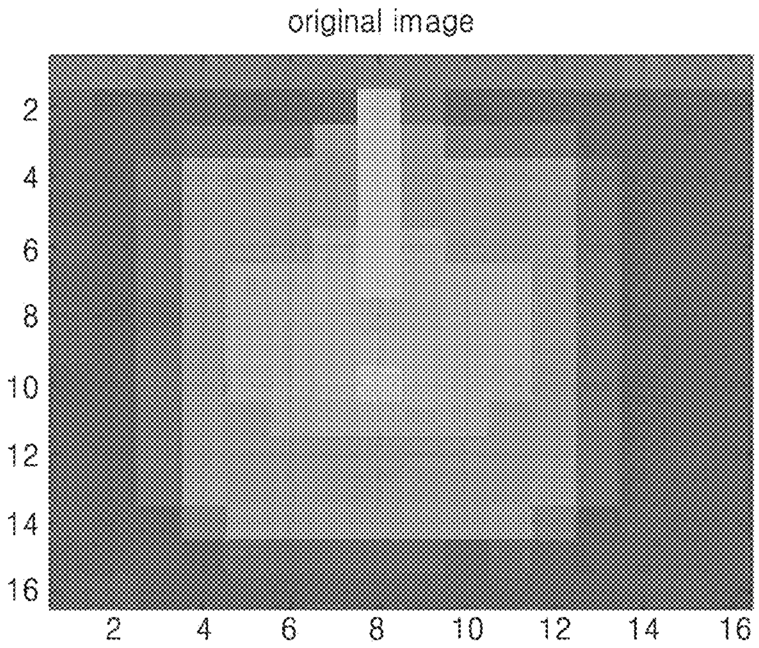
FIGS. 7A to 7C are diagrams illustrating images observed with SAR while transmitting data, according to embodiments of the disclosure.
Figure 7B:
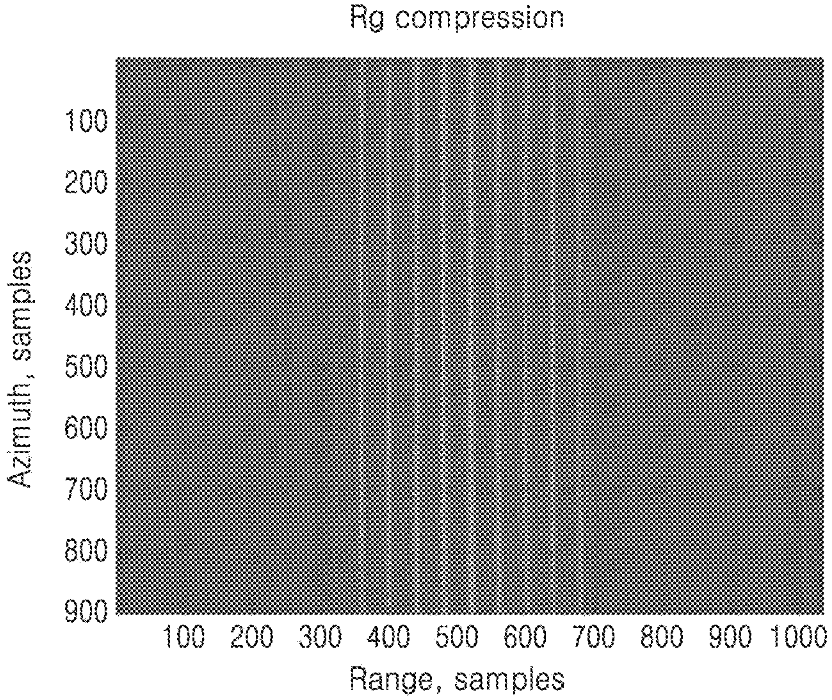
Figure 7C:
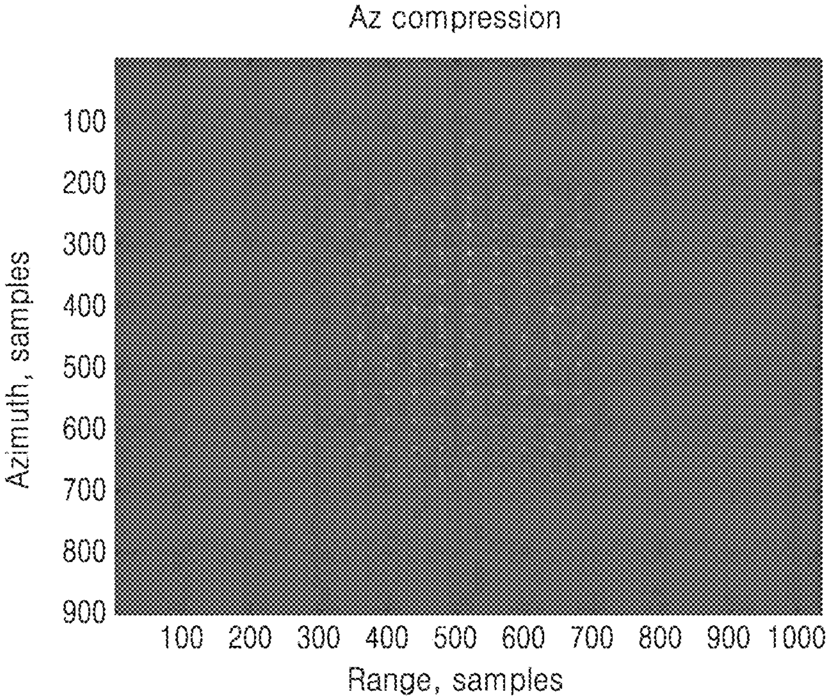

FIGS. 7A to 7C show SAR images observed while transmitting data according to embodiments of the disclosure.

FIG. 7A shows an original image. FIG. 7B shows an image obtained by performing a range compression on a result of SAR observation that is performed using chirp pulses modulated by PSK for data transmission, according to an embodiment of the disclosure. FIG. 7B shows range compression data in a range-time domain. FIG. 7C shows an image obtained by performing azimuth compression on the range compression data shown in FIG. 7B. As shown in FIG. 7C, a shape corresponding to the original image is obtained.

Therefore, according to the disclosure, SAR observation may be performed while transmitting data using chirp pulses.

The layover determination unit 180 may determine, based on range compression data generated by the range compression data generation unit 170, whether a radar layover has occurred. The term "radar layover" refers to a situation in which a chirp pulse transmitted later arrives first. For example, in the case of satellite observation like targets are far away, a chirp pulse reflected from the top of a mountain may arrive before a chirp pulse reflected from the ground arrives. When at least one bit value input to the modulated chirp pulse generation unit 160 is different from at least one bit value contained in a radio signal, range compression may be impossible or may have a negative value. In this case, the layover determination unit 180 may determine that a radar layover has occurred and may perform range compression between received chirp pulses and other candidates of modulated chirp pulses to infer at least one bit value contained in the received chirp pulses.

FIGS. 8A to 8D show examples of range compression data for determining whether a radar layover occurs, according to embodiments of the disclosure. The left side of each of FIGS. 8A to 8D shows an image of the real part of range compression data, and the right side of each of FIGS. 8A to 8D shows an image of the imaginary part of range compression data.

Figure 8A:
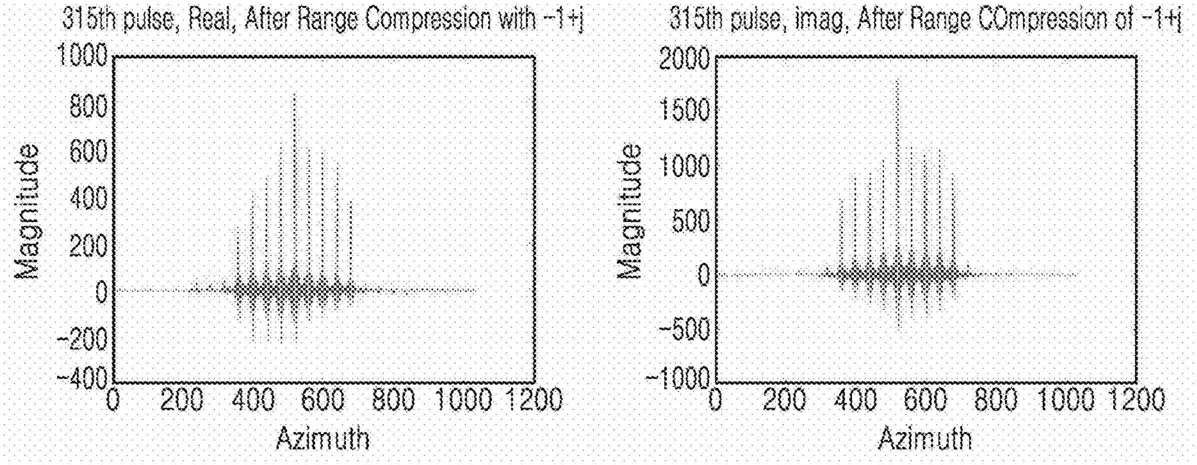
FIGS. 8A to 8D are diagrams illustrating examples of range compression data for determining whether a radar layover has occurred, according to embodiments of the disclosure.

FIG. 8A shows the real part and the imaginary part of range compression data when bit values contained in received chirp pulses are equal to bit values input for generating modulated chirp pulses. When the bit values contained in the received chirp pulses are equal to the bit values input for generating the modulated chirp pulses, both the real part and the imaginary part have mostly positive values as shown in FIG. 8A.

Figure 8B:
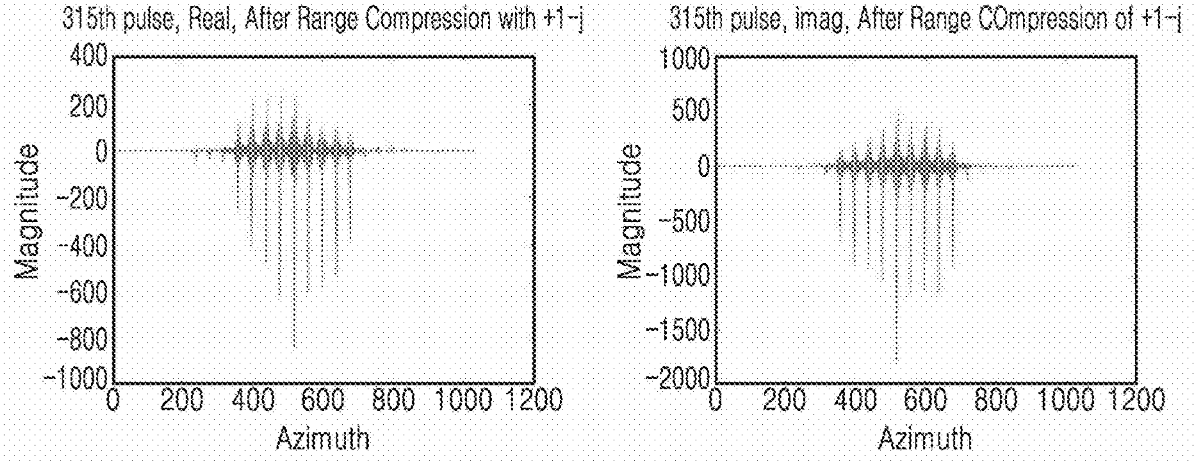

FIG. 8B shows the real part and the imaginary part of range compression data when bit values contained in received chirp pulses are the inversion of bit values input for generating modulated chirp pulses. For example, this means that when the bit values contained in the received chirp pulses are '10,' the bit values input for generating the modulated chirp pulses are '01.' In this case, as shown in FIG. 8B, both the real part and the imaginary part mostly have negative values. Therefore, the layover determination unit 180 may determine the bit values contained in the received chirp pulses by inverting the bit values input for generating the modulated chirp pulses.

Figure 8C:
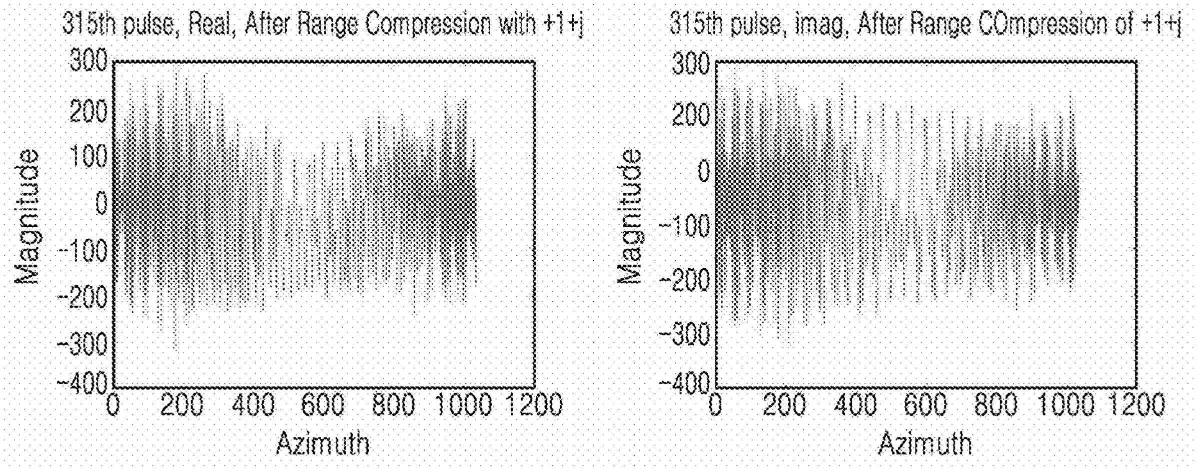
Figure 8D:
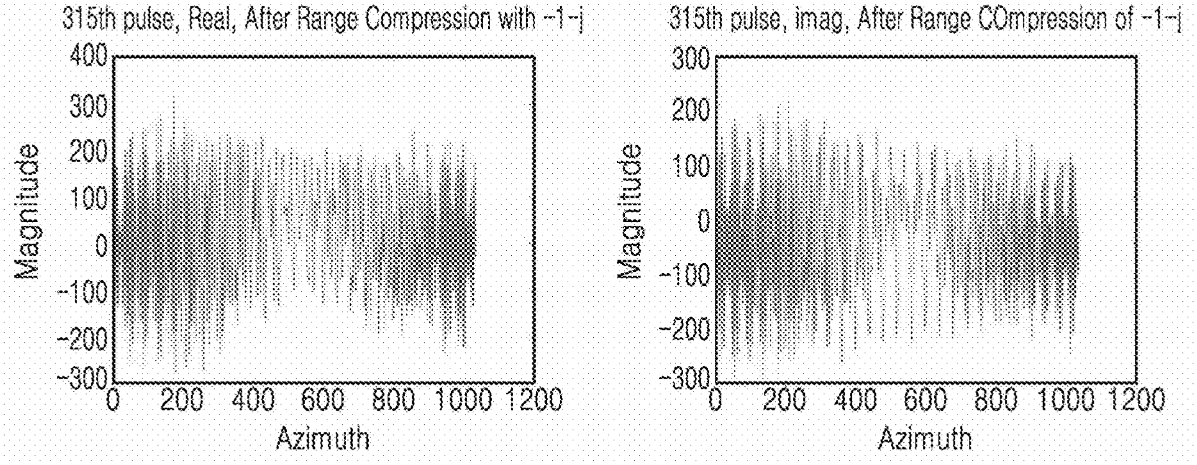

FIGS. 8C and 8D each show the real part and the imaginary part of range compression data when bit values contained in received chirp pulses are different from bit values input for generating modulated chirp pulses. For example, when the bit values contained in the received chirp pulses are '10,' the bit values input for generating the modulated chirp pulses may be '00' or '11.' In this case, as shown in FIGS. 8C and 8D, both the real and imaginary parts are displayed as random numbers, which may be understood as not being compressed in the range direction.

The layover determination unit 180 may generate candidates of modulated chirp pulses corresponding to '00' or '11' by using the bit management unit 150 and the modulated chirp pulse generation unit 160, and may generate range compression data with respect to the candidates of modulated chirp pulses and the received chirp pulses by using the range compression data generation unit 170. In this case, the range compression data may be generated as shown in FIG. 8A or FIG. 8B, and the layover determination unit 180 may infer bit values contained in the received chirp pulses. The layover determination unit 180 may transmit the bit values contained in the received chirp pulses to the bit management unit 150.

The bit management unit 150 may determine at least one bit value that is to be included in a next reflection signal, based on at least one bit value inferred by the layover determination unit 180.

The various embodiments described above are merely examples and are not required to be distinguished from each other and be implemented independent of each other. The embodiments described above may be implemented in combination with each other.

The embodiments described above may be implemented in the form of computer programs executable on a computer using various components, and such computer programs may be stored in non-transitory computer readable media. In this case, the media may continuously store the computer programs or temporarily store the computer programs for execution or download. In addition, examples of the media include various types of recording media or storage such as a piece of hardware or a combination of pieces of hardware. The media are not limited to media directly connected to computer systems and may be distributed over a network. Examples of the media may include: magnetic media such as hard disks, floppy disks, and magnetic tapes; optical recording media such as CD-ROMs and DVDs; magneto-optical media such as floptical disks; ROMs; RAMs; and flash memories configured to store program instructions. Other examples of the media may include recording or storage media managed by app stores, sites, or servers that distribute or supply applications and various other software.

In the specification, the term "unit" or "module" may refer to a hardware component such as a processor or circuit, and/or a software component executable by such a hardware component. For example, "units" or "modules" may be implemented using software components, object-oriented software components, components such as class components and task components, processes, functions, properties, procedures, subroutines, segments of program code, drivers, firmware, microcode, circuitry, data, databases, data structures, tables, arrays and variables.

According to the disclosure, data may be transmitted using chirp pulses used in SAR observation, and thus, an SAR satellite may perform SAR observation and data transmission and reception at the same time by using one antenna and one transceiver without requiring separate antennas and transceivers for SAR observation and data transmission and reception. According to the disclosure, only one frequency band may be used.

In addition, according to the disclosure, even when SAR observation is performed, an SAR reception signal may be recovered according to transmitted data bits, and thus, data transmission may be possible together with SAR observation.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A synthetic aperture radar (SAR) system comprising:

a chirp pulse generation unit configured to generate chirp pulses with a frequency increasing with time;

a data storage unit storing transmission data;

a chirp pulse modulation unit configured to generate modulated chirp pulses by modulating the chirp pulses through phase shift keying according to at least one bit value of the transmission data;

a transceiver unit configured to convert the modulated chirp pulses into a radio signal and transmit the radio signal;

a bit management unit configured to manage bit values of the transmission data and determine at least one bit value contained in a reflection signal that is transmitted by the transceiver unit, reflected from a ground object, and received by the transceiver unit;

a modulated chirp pulse generation unit configured to generate modulated chirp pulses in response to the at least one bit value determined by the bit management unit;

a range compression data generation unit configured to generate range compression data, based on the modulated chirp pulses and received chirp pulses generated from the reflection signal received by the transceiver unit; and a layover determination unit configured to determine, based on the range compression data, whether a radar layover has occurred.

2. The SAR system of claim 1, wherein the chirp pulse modulation unit is further configured to generate the modulated chirp pulses by phase shifting the chirp pulses by a phase value corresponding to two bit values of the transmission data.

3. The SAR system of claim 2, wherein the chirp pulse modulation unit comprises:

a phase shift unit configured to generate first chirp pulses and second chirp pulses, the first and second chirp pulses having a phase difference of 90° from the chirp pulses;

a first modulation unit configured to generate first modulated chirp pulses by multiplying the first chirp pulses by one of +1 and −1 as determined according to a first bit value of the two bit values;

a second modulator configured to generate second modulated chirp pulses by multiplying the second chirp pulses by one of +1 and −1 as determined according to a second bit value of the two bit values; and an adder configured to generate the modulated chirp pulses by adding the first modulated chirp pulses and the second modulated chirp pulses.

4. The SAR system of claim 2, wherein when the chirp pulses (P(t)) are expressed as $A_0\exp(j\alpha t^2)$, the modulated chirp pulses ($P_m(t)$) are expressed as $A_1\exp(j\alpha t^2+jM\pi/2)$, wherein $A_0$ refers to an amplitude of the chirp pulses, $\alpha$ refers to a range chirp rate of the chirp pulses, $A_1$ refers to an amplitude of the modulated chirp pulses, and M refers to a value determined according to the two bit values and is one of 0, 1, 2, and 3.

5. The SAR system of claim 1, wherein the chirp pulse modulation unit is further configured to generate the modulated chirp pulses by phase shifting the chirp pulses by a phase value corresponding to a 1-bit value of the transmission data.

6. The SAR system of claim 5, wherein the chirp pulse modulation unit is further configured to generate the modulated chirp pulses by multiplying the chirp pulses by one of +1 and −1 as determined according to the 1-bit value.

7. The SAR system of claim 5, wherein when the chirp pulses (P(t)) are expressed as $A_0\exp(j\alpha t^2)$, the modulated chirp pulses ($P_m(t)$) are expressed as $A_1\exp(j\alpha t^2+jM\pi)$, wherein $A_a$ refers to an amplitude of the chirp pulses, a refers to a range chirp rate of the chirp pulses, $A_1$ refers to an amplitude of the modulated chirp pulses, and M refers to a value determined according to the 1-bit value and is one of 0 and 1.

8. The SAR system of claim 1, wherein the chirp pulse modulation unit is further configured to generate the modulated chirp pulses by shifting the chirp pulses by a phase value corresponding to three bit values of the transmission data, and the three bit values comprises a first bit value, a second bit value, and a third bit value.

9. The SAR system of claim 8, wherein the chirp pulse modulation unit comprises:

a phase shift unit configured to generate first chirp pulses and second chirp pulses, the first and second chirp pulses having a phase difference of 90° from the chirp pulses;

a first modulation unit configured to generate first modulated chirp pulses by multiplying one of +1 and −1 as determined according to the second bit value, one of $M_1$ and $M_2$ as determined according to the third bit value, and the first chirp pulses;

a second modulation unit configured to generate second modulated chirp pulses by multiplying one of +1 and −1 as determined according to the first bit value, the other of $M_1$ and $M_2$ as determined according to an inversion of the third bit value, and the second chirp pulses; and an adder configured to generate the modulated chirp pulses by adding together the first modulated chirp pulses and the second modulated chirp pulses, wherein $M_1$ and $M_2$ are preset amplitudes.

10. The SAR system of claim 8, wherein when the chirp pulses (P(t)) are expressed as $A_0\exp(j\alpha t^2)$, the modulated chirp pulses ($P_m(t)$) are expressed as $A_1\exp(j\alpha t^2+jM\pi/4)$, wherein $A_0$ refers to an amplitude of the chirp pulses, a refers to a range chirp rate of the chirp pulses, $A_1$ refers to an amplitude of the modulated chirp pulses, and M refers to a value determined according to the three bit values and is one of 0, 1, 2, 3, 4, 5, 6, and 7.

11. The SAR system of claim 8, further comprising a chirp pulse demodulation unit configured to demodulate at least one bit value from received chirp pulses, wherein the transceiver unit is further configured to receive a radio signal from a ground station and generate the received chirp pulses from the received radio signal.

12. The SAR system of claim 11, wherein the received chirp pulses comprise I-channel received chirp pulses and Q-channel received chirp pulses, wherein the chirp pulse demodulation unit comprises:

a phase shift unit configured to generate I-channel chirp pulses and Q-channel chirp pulses from the chirp pulses;

a first demodulation unit configured to generate a first output signal by performing a matched filtering process on the I-channel received chirp pulses and the I-channel chirp pulses;

a second demodulation unit configured to generate a second output signal by performing a matched filtering process on the Q-channel received chirp pulses and the Q-channel chirp pulses; and a bit value determination unit configured to demodulate two bit values contained in the received radio signal, based on the first output signal and the second output signal.

13. The SAR system of claim 12, wherein the bit value determination unit is further configured to generate a reception timing of the received chirp pulses, based on at least one selected from the group consisting of the first output signal and the second output signal.

14. The SAR system of claim 11, wherein the chirp pulse demodulation unit comprises:

a demodulation unit configured to generate an output signal by performing a matched filtering process on the received chirp pulses and the chirp pulses; and a bit value determination unit configured to demodulate, based on the output signal, an one bit value contained in the received radio signal.

15. The SAR system of claim 1, wherein the range compression data generation unit is further configured to generate the range compression data by multiplying a result of Fourier transforming the received chirp pulses in a range direction and a conjugate of a result of Fourier transforming the modulated chirp pulses in the range direction.

16. The SAR system of claim 1, wherein the layover determination unit is further configured to, when the layover determination unit determines that a radar layover has occurred in the received chirp pulses, generate candidates of modulated chirp pulses corresponding to a bit value different from the modulated chirp pulses, generate range compression data with respect to the received chirp pulses and the candidates of modulated chirp pulses, and, based on the range compression data, infer at least one bit value contained in the received chirp pulses.

17. The SAR system of claim 1, wherein the bit management unit is further configured to determine, based on the at least one bit value inferred by the layover determination unit, at least one bit value that is to be included in a next reflection signal to be received next time.

* * * * *